(12) United States Patent
Mäki et al.

(10) Patent No.: US 12,363,214 B2
(45) Date of Patent: Jul. 15, 2025

(54) ELECTRONIC DEVICE HAVING A ROLLING DISPLAY COMPRISING MAGNETIC MEANS FOR FLATTENING THE DISPLAY WHEN EXTRACTED

(71) Applicants: HUAWEI TECHNOLOGIES CO., LTD., Guangdong (CN); Jouni Tapio Mäki, Helsinki (FI)

(72) Inventors: Jouni Tapio Mäki, Helsinki (FI); Kaisla Alina Mäkinen, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 17/796,411

(22) PCT Filed: Jan. 31, 2020

(86) PCT No.: PCT/EP2020/052453
§ 371 (c)(1),
(2) Date: Jul. 29, 2022

(87) PCT Pub. No.: WO2021/151506
PCT Pub. Date: Aug. 5, 2021

(65) Prior Publication Data
US 2023/0341900 A1   Oct. 26, 2023

(51) Int. Cl.
*H04M 1/02* (2006.01)
*G06F 1/16* (2006.01)

(52) U.S. Cl.
CPC ........ *H04M 1/0268* (2013.01); *G06F 1/1624* (2013.01); *G06F 1/1652* (2013.01); *G06F 1/1679* (2013.01)

(58) Field of Classification Search
CPC .. G06F 1/1652; G06F 1/1624; G06F 3/04886; H04M 1/0268; H04M 1/0235; G03B 21/58; G09G 2380/02; G09G 3/035
See application file for complete search history.

(56) References Cited

U.S. PATENT DOCUMENTS

2007/0285337 A1   12/2007   Maddock
2017/0060183 A1   3/2017   Zhang et al.
(Continued)

FOREIGN PATENT DOCUMENTS

CN   106131251 A   11/2016
CN   107403590 A   11/2017
(Continued)

*Primary Examiner* — Khalid W Shaheed
(74) *Attorney, Agent, or Firm* — WOMBLE BOND DICKINSON (US) LLP

(57) ABSTRACT

An electronic device comprises a chassis module and a rolling display arrangement partially enclosing said chassis module to slide between a retracted position and an extended position. The chassis module comprises a body having a rounded edge and a first part of a magnetic pair in a mid-section of the body proximal to the rounded edge. The rolling display arrangement comprises a foldable sheet and a support arrangement arranged to support the foldable sheet. The rolling display arrangement comprises a second part of a magnetic pair in a section opposing the first part of the magnetic pair when the rolling display arrangement is in the retracted position, said first part and second part of the magnetic pair being magnetically attracted to each other.

18 Claims, 5 Drawing Sheets

(56) References Cited

U.S. PATENT DOCUMENTS

| | | |
|---|---|---|
| 2017/0064847 A1 | 3/2017 | Lim |
| 2017/0278436 A1 | 9/2017 | Chu |
| 2017/0357289 A1 | 12/2017 | Ahn |
| 2018/0103550 A1 | 4/2018 | Seo et al. |
| 2018/0107250 A1 | 4/2018 | Cho |
| 2018/0375054 A1 | 12/2018 | Wang et al. |
| 2020/0159288 A1* | 5/2020 | Song ........................ G09F 9/301 |

FOREIGN PATENT DOCUMENTS

| | | |
|---|---|---|
| CN | 107578705 A | 1/2018 |
| CN | 208044998 U | 11/2018 |
| CN | 109074766 A | 12/2018 |
| CN | 109308850 A | 2/2019 |
| CN | 110211506 A | 9/2019 |
| KR | 20170142755 A | 12/2017 |
| KR | 20180064472 A | 6/2018 |
| WO | 2017022926 A1 | 2/2017 |
| WO | 2018051414 A1 | 3/2018 |
| WO | 2019153256 A1 | 8/2019 |
| WO | 2019153257 A1 | 8/2019 |

* cited by examiner

ELECTRONIC DEVICE HAVING A ROLLING DISPLAY COMPRISING MAGNETIC MEANS FOR FLATTENING THE DISPLAY WHEN EXTRACTED

CROSS-REFERENCE TO RELATED APPLICATIONS

This application is a National Stage of International Application No. PCT/EP2020/052453, filed on Jan. 31, 2020, which is hereby incorporated by reference in its entirety.

TECHNICAL FIELD

The disclosure relates to an electronic device comprising a chassis module and a rolling display arrangement, said rolling display arrangement partially enclosing said chassis module and being configured for sliding between a retracted position and an extended position.

BACKGROUND

The size of mobile devices, such as tablets and mobile phones, is an important consideration when designing mobile devices. In order to provide a consumer appealing mobile device, the outer dimensions of the device have to be as small as is technically feasible, while still allowing the display of the device to be as large as possible.

This problem may be solved, e.g., by means of a foldable electronic device comprising one or several support bodies, e.g. interconnected by means of hinges, covered by a display. The support body/bodies and the display can be folded together to provide an as small electronic device as possible, i.e. at least partially covering both main faces of the device, and unfolded to provide an as large display as possible, i.e. the display covering only one main face of the device and protruding from said main face.

As the bending radius of the display changes, there will inevitably be more or less deformation of the display. This is due to, as the display is folded around the electronic device, the display stretching on one side of the neutral axis and compressing on the other side of the neutral axis. The neutral axis is the axis along which the display or the housing remains unchanged as the device is folded, i.e. it neither stretches nor compresses.

The situation is even more complex when the display is extendable. In this case, the display is both bent around the device and moved around the edge of the device as it is extended. The bending of the display below a certain bending radius causes a bulge to appear on a middle area. The bulge results in visual defects.

SUMMARY

It is an object to reduce or eliminate the visual defects that results from the formation of a bulge on the display. This and other objects are achieved by the features of the independent claims. Further embodiments are apparent from the dependent claims, the description, and the figures.

According to a first aspect, there is provided an electronic device comprising a chassis module and a rolling display arrangement, the rolling display arrangement partially enclosing the chassis module and being configured to slide between a retracted position and an extended position. The chassis module comprises a body having a rounded edge and a first part of a magnetic pair in at least a mid-section of the body proximal to the rounded edge, and the rolling display arrangement comprises a foldable sheet and a support arrangement arranged to support the foldable sheet. The rolling display arrangement comprises a second part of a magnetic pair in at least a section opposing the first part of the magnetic pair when the rolling display arrangement is in the retracted position, the first and second part of the magnetic pair being magnetically attracted to each other.

In an embodiment of the first aspect, the first part of the magnetic pair is a static magnet and the second part of the magnetic pair is a magnetic material. It is generally possible to provide the first part of the magnetic pair with a mass higher than the second part of the magnetic pair. Therefore, the magnetic attraction between the parts of the magnetic pairs can be higher in an embodiment.

In an embodiment of the first aspect, the foldable sheet is a flexible display having a plastic base layer. While other types of foldable sheets can be used, the display types having a plastic layer are easier to bend around the rounded edge. A display of particular interest is POLED (Plastic Organic Light Emitting Diode). A range of plastics may be used as the plastic base layer, including polyethylene terephthalate (PET) and polyethylene naphthalate (PEN).

In an embodiment of the first aspect, the magnetic material is included in or attached to the plastic base layer. In an embodiment, the magnetic material may be a sheet laminated in the plastic base layer or particles of magnetic material is dispersed on the plastic base layer.

In an embodiment of the first aspect, the support arrangement comprises a plurality of parallel support rods arranged perpendicular to the sliding direction to support the foldable sheet. Suitably, each support rod is substantially tapered from a base section to an apex section, the base section being attached to the foldable sheet. To obtain a smooth sliding experience usually the apex sections being moved towards each other when the foldable sheet is folded around the rounded edge of the chassis module.

In an embodiment of the first aspect, the body of the chassis module is oblong having a pair of opposing short edges and a pair of opposing longer edges, the rounded edge being one of the longer edges.

In an embodiment of the first aspect, the first part of the magnetic pair is a static magnet having a planar side facing the rolling display arrangement. A planar static magnet may provide a uniform magnetic attraction over essentially the whole area of the magnet. In an embodiment, the first part of the magnetic pair is static magnet formed as a roll configured to turn when the rolling display arrangement is slid between the retracted position and the extended position. A static magnet formed as a roll allows for an arrangement with less friction, which may be translated into better user experience.

In an embodiment of the first aspect, a roller is positioned adjacent to the first part of the magnetic pair, said roller having a diameter larger than the thickness of the body to provide for a clearance between the surface of the first part of the magnetic pair and the rolling display arrangement. The presence of a clearance prevents a direct physical contact between the magnet and the rolling display arrangement, obtaining less friction. The roller may be prepared from a number of materials, such as polymer materials. A suitable polymer material for the roller is POM (polyoxymethylene) due to its low friction properties. In an embodiment of the present application, the first part of the magnetic pair is formed as a roll and the roller are positioned co-axially in the body of the chassis module, the axis being parallel to the rounded edge. Suitably, rollers are co-axially disposed on both sides of the first part of the magnetic pair to obtain the same clearance distance between the surface of the first part of the magnetic pair and the rolling display arrangement.

In an embodiment of the first aspect, the magnetic attraction between the first and the second part of the magnetic pair is sufficient to prevent bulging of the rolling display arrangement. When a planar static magnet is used as the first part of the magnetic pair it may be provided on both sides of the body of the chassis module to prevent bulging on both sides of the electronic device.

In an embodiment of the first aspect, the second part of the magnetic pair is present in a section of the rolling display arrangement opposing the first part of the magnetic pair when the rolling display arrangement is in the retracted, extended and any intermediary position. According to an embodiment attraction remains between the chassis module and the rolling display arrangement through the sliding process. In an embodiment, the second part of the magnetic pair is present in the entire extent of the rolling display arrangement. Suitably, the second part of the magnetic pair is a metal foil provided on or incorporated in the plastic base layer of a flexible display.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

The static magnet generally comprises a material selected among "hard" ferromagnetic materials such as iron, nickel, aluminum, copper, titanium, and cobalt or their alloys, that can be magnetized to produce a permanent magnetic field. Non-limiting examples include alnico and ferrite. The magnetic material generally comprises "soft" ferromagnetic materials that can be temporarily magnetized but do not tend to stay magnetized when a magnetic field is not present. Non-limiting examples of "soft" ferromagnetic materials include annealed iron and carbon steel.

Figure 1A:
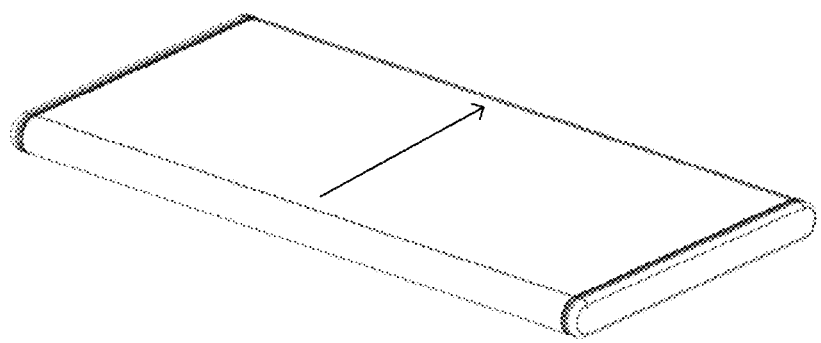
FIGS. 1A-1C disclose the prior art according to which a bulging of the display occurs according to an embodiment of the application.
Figure 1B:
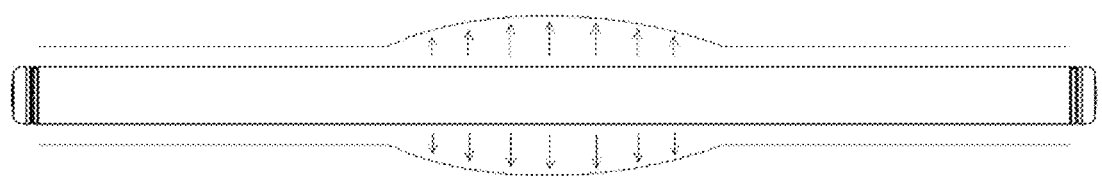
Figure 1C:
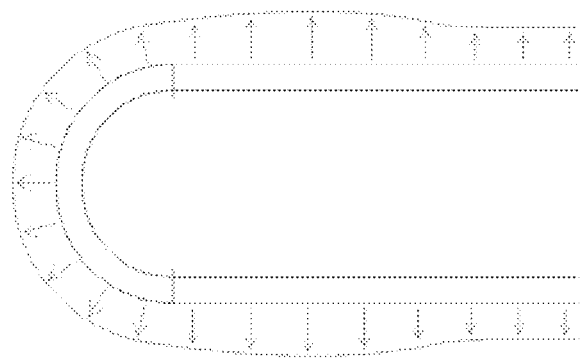
Figure 7A:
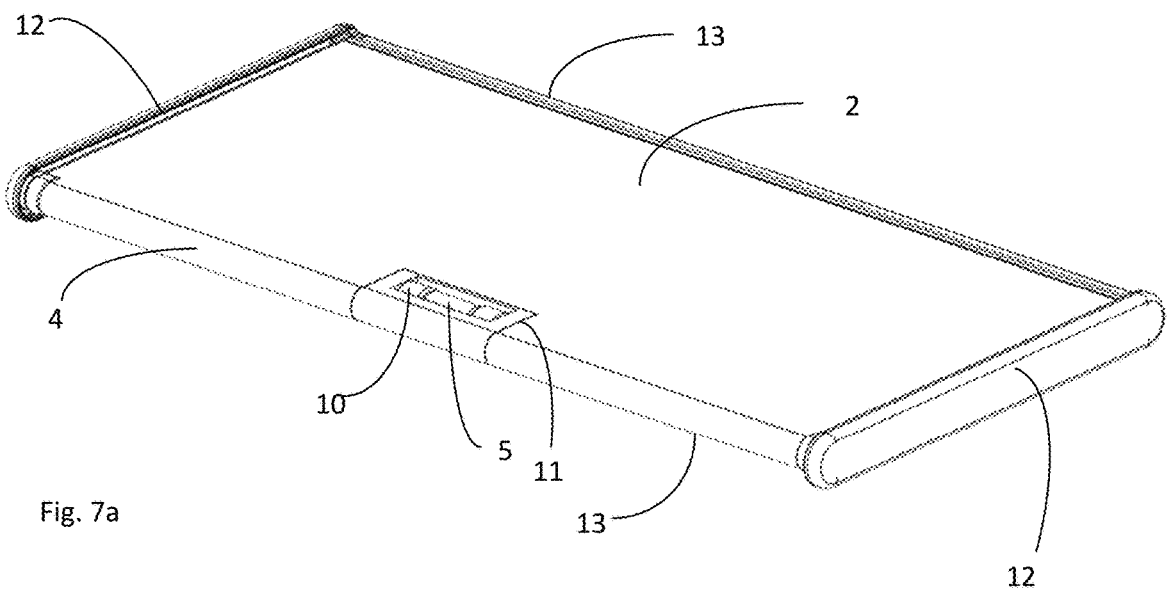
FIGS. 7A and 7B show a chassis module with a static magnet formed as a roll according to an embodiment of the application.

FIGS. 1A-1C disclose the prior art and the technical problem. FIG. 7A shows an electronic device comprising a chassis module and a rolling display arrangement partially enclosing said chassis module and being in a retracted position. The arrow indicates the drawing direction of the rolling display arrangement for sliding from the retracted position shown to an extended position. FIG. 1B discloses an end view of an electronic device and FIG. 1C discloses a cross-section of the electronic device in which the display bulges at the middle area proximal to the rounded edge of the body. The arrows indicate the forces attempting to open the folded display.

Figure 2:
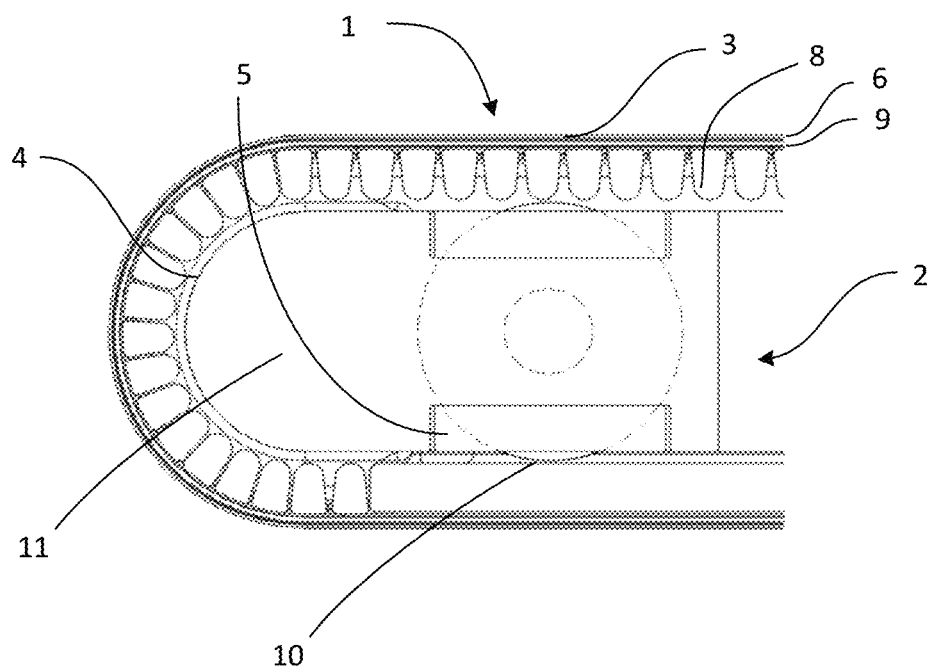
FIG. 2 shows a cross-sectional view of an electronic device according to an embodiment of the application.

FIG. 2 shows a cross-sectional view of a part of the electronic device 1. The electronic device comprises a chassis module 2 and a rolling display arrangement 3. The rolling display arrangement covers the surface of the chassis module in the shown part of the electronic device. The chassis module comprises a body 11 having a rounded edge 4 with the rolling display arrangement bend around. The body 11 of the chassis module also comprises a first part of a magnetic pair 5 in a midsection of the body 11 proximal to the rounded edge. The first part of a magnetic pair of the magnetic pair is shown as a static magnet having a planar surface directed towards the rolling display arrangement.

The rolling display arrangement comprise a foldable sheet 6 and a support arrangement comprising a plurality of support rods 8 arranged to support the foldable sheet. The support rods are preferably made of stiff material such that they do not bend in any direction but remain essentially straight regardless of their position. Each support rod may be substantially tapered, such that the support rods 5 do not collide as the foldable support structure folds. The tapering extends from a base section to an apex section, the base section being arranged adjacent the foldable sheet 6. The apex sections are moved towards each other when the foldable sheet is folded around the rounded edge. The base section may comprise a concave surface (not shown), the concave surface being in supportive abutment to the foldable sheet. This allows the foldable sheet to extend as smoothly as possible when the supportive arrangement is folded.

The rolling display arrangement comprises a second part of the magnetic pair 9. In the present embodiment, the second part of the magnetic pair is a magnetic material included in or attached to a plastic base layer of the foldable sheet. The magnetic material is included in at least a section of the foldable sheet opposing the first part of the magnetic pair, i.e. the planar static magnet, when the rolling display arrangement is in the retracted position. Thus, it is ensured that the foldable sheet remains flush with the rest of the display, when the electronic device is used in the retracted position. Usually, the magnetic material is positioned in a section of the foldable sheet opposing the first pair of the magnetic material when the rolling display arrangement is in the retracted position, the extended position, and any intermediary position. In this latter embodiment, the bulging is prevented or reduced in any sliding positions, including any intermediary position.

Figure 3:
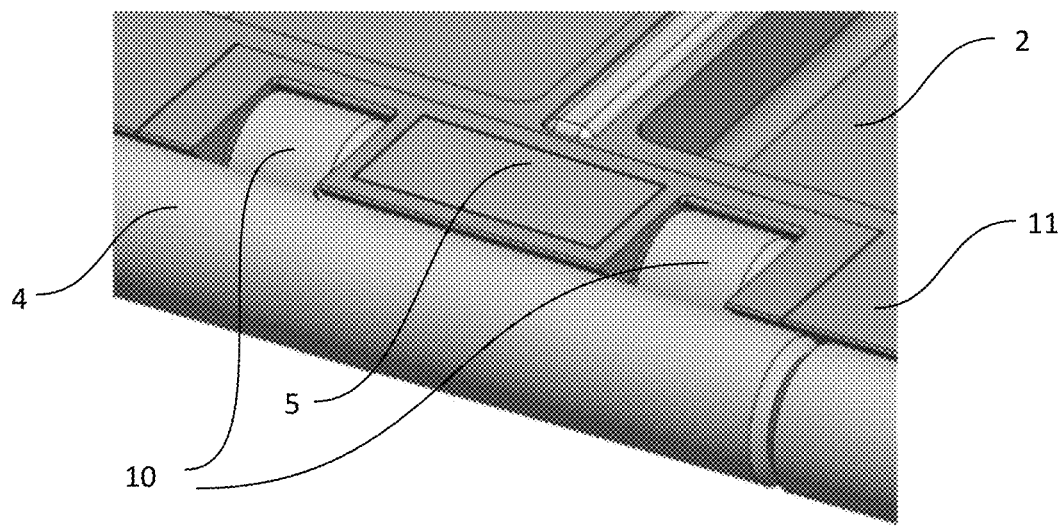
FIG. 3 shows a perspective view of a chassis module with a planar static magnet having the rolling display arrangement removed according to an embodiment of the application.

In dashed lines FIG. 2 shows a roller 10. FIG. 3 illustrates that the roller is positioned adjacent to the planar static magnet. Suitably, as illustrated on FIG. 3, rollers are positioned on each side of the planar static magnet to reduce the friction when the foldable sheet is sled over the body 11 of the chassis module. The rollers have a diameter larger than the thickness of the body 11 to provide a clearance between the surface of the magnet and the rolling display arrangement. The clearance prevents a direct physical contact between the surface of the magnet and the rolling display arrangement to obtain less friction when the rolling display arrangement is sled over the chassis module. The rounded edge 4 of the embodiment shown in FIG. 3 are illustrated as a section of rolls, which are turned when the rolling display arrangement is sled from one position to another. The use of a section of rolls results in a low friction.

Figure 4:
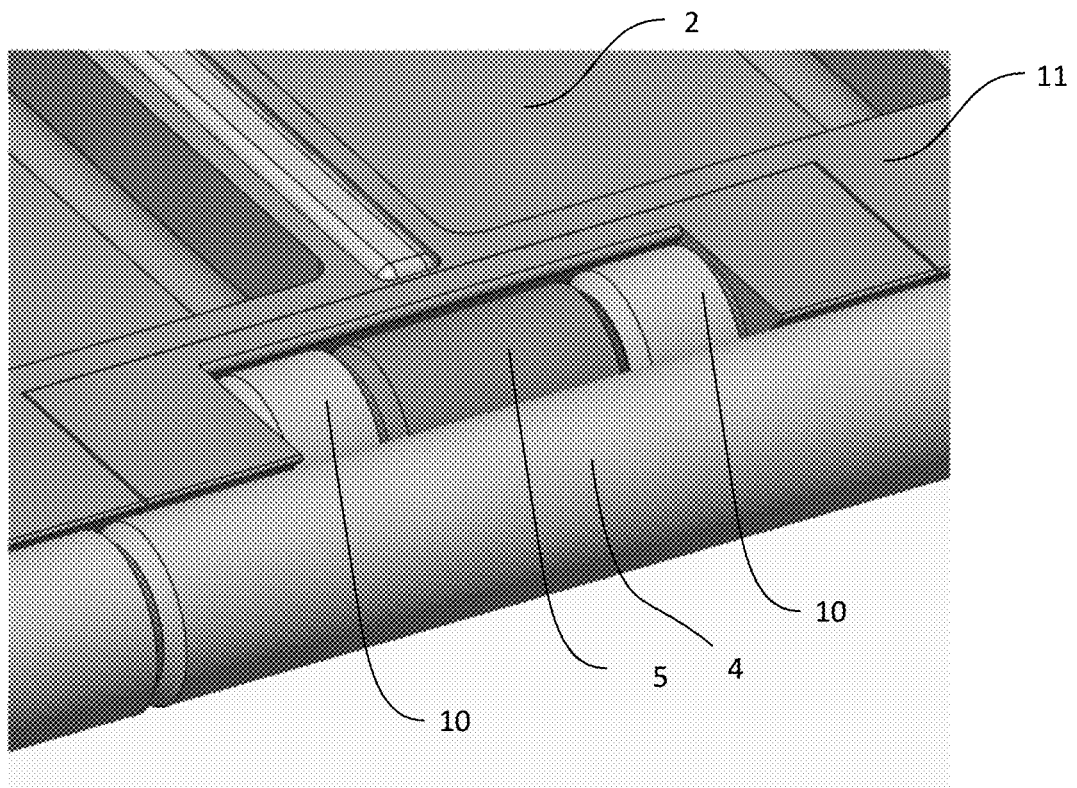
FIG. 4 shows a perspective view of a chassis module with a static magnet formed as a roll having the rolling display arrangement removed according to an embodiment of the application.

FIG. 4 discloses an embodiment in which the similar to the embodiment shown in FIG. 3, however, using a magnet formed as roll 11. The roll 5 is positioned co-axially with the rollers 10 and is configured to turn when the rolling display arrangement is sled between the retracted position P1 and the extended position P3. The diameter of the magnet formed as a roll is generally smaller than the diameter of the rollers 5 to allow for the formation of a clearance that prevent a direct physical contact with the rolling display arrangement.

Figure 5A:
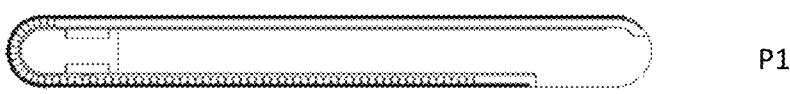
FIGS. 5A-5C show three sliding positions according to an embodiment of the application.
Figure 5B:
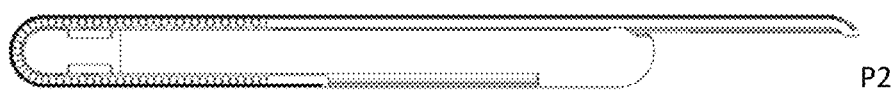
Figure 5C:
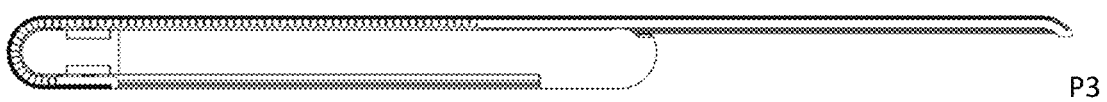

FIGS. 5A-5C disclose three sliding positions. In the position shown in FIG. 5A the rolling display arrangement is in a retracted position P1. FIG. 5B shows the rolling display arrangement is in an intermediary position P2 and FIG. 5C shows the rolling display arrangement is in an extended position P3.

Figure 6A:
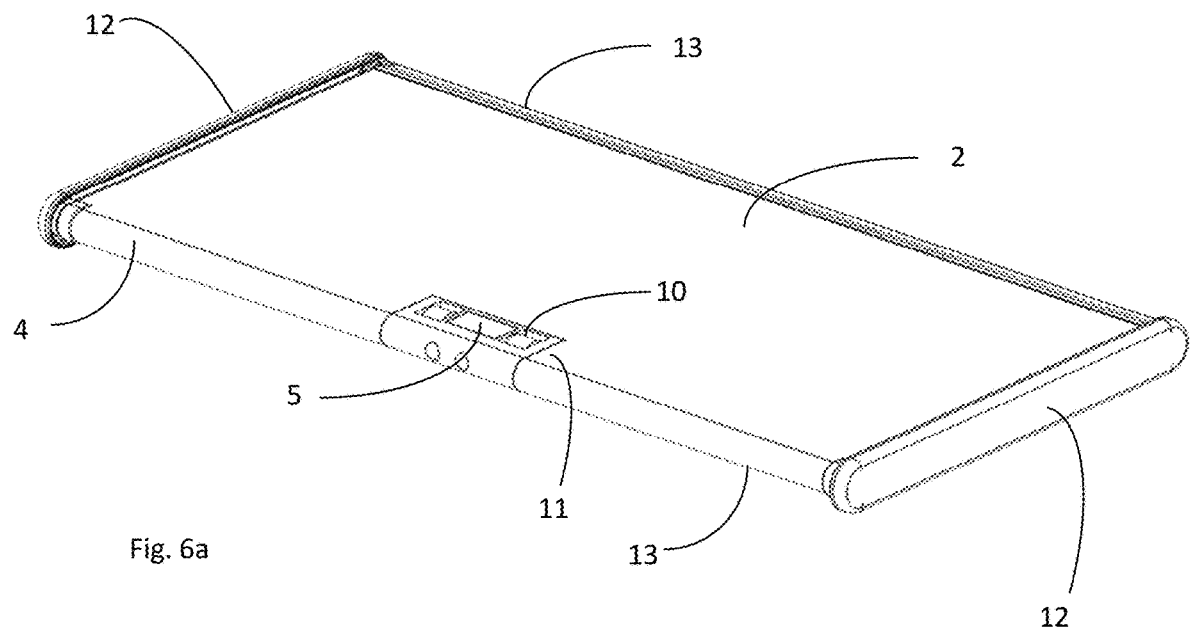
FIGS. 6A and 6B show a chassis module with a planar static magnet according to an embodiment of the application.
Figure 6B:
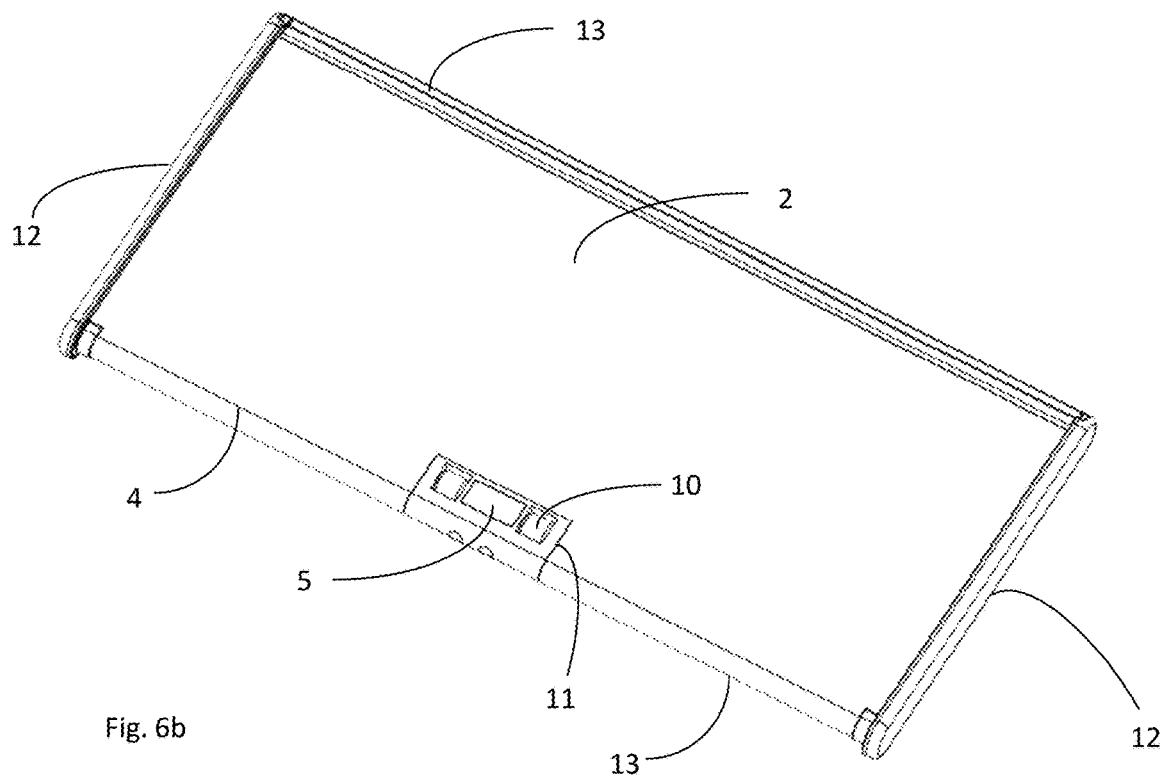

FIGS. 6A and 6B show an embodiment of the application using a chassis module 2 with a planar static magnet 5. On each side of the planar static magnet rollers 10 are positioned to reduce the friction during sliding of the not shown rolling display arrangement. The chassis module is provided with rounded edges suitable for abutment with the rolling display arrangement.

Figure 7B:
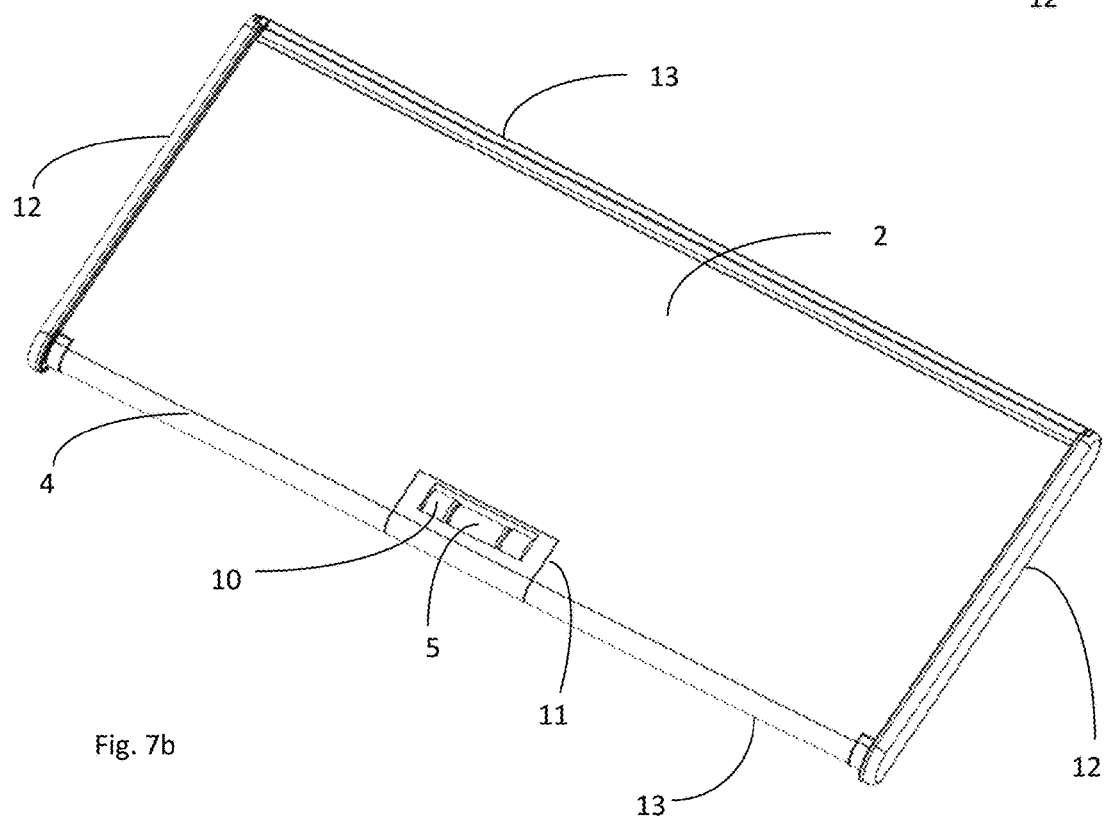

FIGS. 7A and 7B show an embodiment of the application using a chassis module 2 with a static magnet formed as a roll 11. On each side of the magnet rollers 10 are positioned to reduce the friction during sliding of the not shown rolling display arrangement. The chassis module is provided with rounded edges 4 suitable for abutment with the rolling display arrangement.

The various aspects and embodiments have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or operations, and the indefinite article "a" or "an" does not exclude a plurality. A single magnet or other unit may fulfill the functions of several items recited in the claims. The mere fact that certain measures are recited in mutually different dependent claims does not indicate that a combination of these measured cannot be used to advantage.

The reference signs used in the claims shall not be construed as limiting the scope. Unless otherwise indicated, the drawings are intended to be read e.g., cross-hatching, arrangement of parts, proportion, degree, etc. together with the specification, and are to be considered a portion of the entire written description of this disclosure.

What is claimed is:

1. An electronic device comprising:
a chassis module comprising a body having a rounded edge and a first part of a magnetic pair in at least a mid-section of the body proximal to the rounded edge, and
a rolling display arrangement partially enclosing the chassis module to slide between a retracted position and an extended position, wherein
the rolling display arrangement comprises:
a foldable sheet,
a support arrangement arranged to support the foldable sheet, and
a second part of the magnetic pair in at least a section opposing the first part of the magnetic pair when the rolling display arrangement is in the retracted position, the first part and the second part of the magnetic pair being magnetically attracted to each other.

2. The electronic device according to claim 1, wherein the first part of the magnetic pair is a static magnet and wherein the second part of the magnetic pair is a magnetic material.

3. The electronic device according to claim 1, wherein the foldable sheet is a flexible display having a plastic base layer.

4. The electronic device according to claim 3, wherein a magnetic material is included in or attached to the plastic base layer.

5. The electronic device according to claim 1, wherein the support arrangement comprises a plurality of parallel support rods arranged perpendicular to a sliding direction to support the foldable sheet.

6. The electronic device according to claim 5, wherein each support rod is tapered from a base section to an apex section, the base section being attached to the foldable sheet.

7. The electronic device according to claim 6, wherein apex sections of the support rods are moved towards each other when the foldable sheet is folded around the rounded edge of the chassis module.

8. The electronic device according claim 1, wherein the body of the chassis module is oblong having a pair of opposing short edges and a pair of opposing longer edges, the rounded edge being one of the longer edges.

9. The electronic device according claim 1, wherein the first part of the magnetic pair is a static magnet having a planar side facing the rolling display arrangement.

10. The electronic device according claim 1, wherein the first part of the magnetic pair is static magnet formed as a roll configured to turn when the rolling display arrangement is slid between the retracted position and the extended position.

11. The electronic device according to claim 1, wherein at least one roller is positioned adjacent to the first part of the magnetic pair, the roller(s) having a diameter larger than thickness of the body to provide for a clearance between a surface of the first part of the magnetic pair and the rolling display arrangement.

12. The electronic device according to claim 10, wherein the first part of the magnetic pair and at least one rollers is positioned co-axially in the body of the chassis module, an axis being parallel to the rounded edge.

13. The electronic device according to claim 10, wherein at least one rollers is co-axially disposed adjacent opposite ends of the first part of the magnetic pair.

14. The electronic device according to claim 1, wherein magnetic attraction between the first part and the second part of the magnetic pair is to prevent bulging of the rolling display arrangement.

15. The electronic device according to claim 1, wherein the first part of the magnetic pair is provided on both sides of the body of the chassis module to prevent bulging on both sides of the electronic device.

16. The electronic device according to claim 1, wherein the second part of the magnetic pair is arranged in a section of the rolling display arrangement opposing the first part of the magnetic pair when the rolling display arrangement is in the retracted, extended and any intermediary position.

17. The electronic device according to claim 1, wherein the second part of the magnetic pair is present in entire extent of the rolling display arrangement.

18. The electronic device according to claim 2, wherein the second part of the magnetic pair is a metal foil provided on or incorporated in a plastic base layer of a flexible display.

\* \* \* \* \*

UNITED STATES PATENT AND TRADEMARK OFFICE
CERTIFICATE OF CORRECTION

| | | |
|---|---|---|
| PATENT NO. | : 12,363,214 B2 | Page 1 of 1 |
| APPLICATION NO. | : 17/796411 | |
| DATED | : July 15, 2025 | |
| INVENTOR(S) | : Jouni Tapio Mäki et al. | |

It is certified that error appears in the above-identified patent and that said Letters Patent is hereby corrected as shown below:

In the Claims

In Column 6, Claim 11, Line 40, delete "the roller(s) having" and insert --the at least one roller--.

Signed and Sealed this
Fourth Day of November, 2025

John A. Squires
*Director of the United States Patent and Trademark Office*